US006609079B1

(12) United States Patent
Seitlinger

(10) Patent No.: US 6,609,079 B1
(45) Date of Patent: Aug. 19, 2003

(54) METHOD AND ARRANGEMENT FOR ASCERTAINING STATE VARIABLES

(75) Inventor: Walter Seitlinger, Weiz (AT)

(73) Assignee: Va Tech Elin Transformatoren GmbH, Weiz (AT)

( * ) Notice: Subject to any disclaimer, the term of this patent is extended or adjusted under 35 U.S.C. 154(b) by 0 days.

(21) Appl. No.: 09/700,204

(22) PCT Filed: May 6, 1999

(86) PCT No.: PCT/AT99/00110

§ 371 (c)(1),
(2), (4) Date: Nov. 13, 2000

(87) PCT Pub. No.: WO99/60682

PCT Pub. Date: Nov. 25, 1999

(30) Foreign Application Priority Data

May 14, 1998 (AT) ............................................... 828/98

(51) Int. Cl.$^7$ ............................................. G01K 17/00
(52) U.S. Cl. ..................................... 702/136; 340/646
(58) Field of Search ................................ 702/136, 132; 336/55, 57, 58; 340/646

(56) References Cited

U.S. PATENT DOCUMENTS

| 4,573,132 A | 2/1986 | Boothman et al. |
| 4,623,265 A | 11/1986 | Poyser |
| 4,654,806 A | 3/1987 | Poyser et al. |
| 4,754,405 A | 6/1988 | Foster |

FOREIGN PATENT DOCUMENTS

| FR | 2526599 | 11/1983 |
| SU | 1742750 | 6/1990 |
| WO | 88/04488 | 6/1988 |

OTHER PUBLICATIONS

English Language Abstract of Soviet Union patent No:1742750 A1.

Primary Examiner—John Barlow
Assistant Examiner—Anthony T. Dougherty
(74) Attorney, Agent, or Firm—Greenblum & Bernstein, P.L.C.

(57) ABSTRACT

In a method for ascertaining temperatures (tqm, tqh, tom, tok) in an oil-cooled transformer, the transformer terminal voltages (2), the winding currents (3) and the ambient temperature (6) are measured. Furthermore, the status (5) of fans and pumps and the switch position (4) of a stepping switch are established. The measured and established variables (2, 3, 4, 5, 6) are fed to a thermohydraulic model (7), in which state variables (19) are calculated with auxiliary variables (9), which are losses (10) in the transformer, heat transfer parameters (11), flow resistances (13) and the oil flow (12), and a hydraulic network of the oil circuit, which has branches and nodes. The state variables (19) are the average temperatures (tqm) and the hotspot temperatures (tqh) in loss-producing parts of the transformer and the average oil temperatures in branches (tom) and in nodes (tok) of the hydraulic network of the oil circuit. When there is a change in the variables measured and established (2, 3, 4, 5, 6), the auxiliary variables (9) are adapted appropriately, and the rate of change of the state variables (19) is subsequently ascertained and new state variables (19) are consequently calculated. With this method, temperatures (tqm, tqh, tom, tok) and their changes in the transformer are ascertained without temperature sensors, whereby the optimum operation of the transformer is ensured, an early detection of errors and risks takes place and the optimum point in time for service work can be established.

35 Claims, 2 Drawing Sheets

METHOD AND ARRANGEMENT FOR ASCERTAINING STATE VARIABLES

CROSS-REFERENCE TO RELATED APPLICATIONS

The present application is a U.S. National Stage application of International Application No. PCT/AT99/00110, filed May 6, 1999, which claims priority under 35 U.S.C. §119 of Austrian Application No. A828/98 filed May 14, 1998.

BACKGROUND OF THE INVENTION

1. Field of the Invention

The invention relates to a method for screening state variables, in particular temperatures, in an oil-cooled transformer.

2. Discussion of Background Information

Transformers are electrotechnical devices which have today already reached a very high level of technical and technological sophistication. Nevertheless, further developments are still possible and necessary, but involve a correspondingly high level of expenditure and risk, including from a commercial viewpoint.

In the currently evolving situation with the free exchange of energy over large distances, the question concerning the extent to which a transformer can be operated with overload without a significant loss in terms of service life is gaining increasingly in importance.

To be regarded as the current state of the art in this respect are the documents U.S. Pat. No. 4,654,804 and FR-A-2 526 599.

The first-mentioned document discloses a method for monitoring and analyzing transformer parameters, such as for example temperatures, winding currents, oil pressure, etc. All the parameters to be monitored must in this case be picked up by use of sensors and they are then compared with predetermined limit values. For this purpose, limit values which do not take into consideration external conditions surrounding the transformer, such as for example the ambient temperature, must be fixed in advance. Since the analysis of all the transformer parameters is based here on a simple comparison, this method also cannot be used for a simulation of specific situations.

The second document relates, inter alia, to an air-cooled transformer, that is to say to a thermopneumatic system and not to a thermohydraulic system, as is present in an oil-cooled transformer.

SUMMARY OF THE INVENTION

An aspect of the invention is consequently to provide a method which supplies information on important temperatures, for example the hotspot and hot-oil temperatures, and can additionally be used for forecasting, simulation and analysis.

This aspect is achieved by input variables, in particular the voltages at the transformer terminals, the currents in the windings and the ambient temperature, being measured, and the status of cooling units, which are fans, pumps etc., and possibly the position of a switch, such as for example a stepping switch or the like being established, by these input variables and the status of the cooling units and the switch position being fed to a thermohydraulic model and by state variables being calculated in the thermohydraulic model with auxiliary variables, which are for example losses in the transformer, parameters for the heat transfer, flow resistances and the flow rates in the oil circuit, and a hydraulic network of the oil circuit, which has branches and nodes, these state variables preferably being the average temperatures and the hotspot temperatures in the loss-producing parts of the transformer and the average oil temperatures in branches and in nodes of the hydraulic network of the oil circuit, and by the auxiliary variables being adapted appropriately to the current value of the state variables when there is a change in the input variables and/or the status of the cooling units and/or of the switch position, and the change over time of the state variables subsequently being calculated and new state variables being calculated with these changes. With this method, it is consequently possible for the first time to ascertain the operating temperatures and also the critical temperatures as well as their changes in parts of the transformer without temperature sensors, whereby the optimum operation of the transformer is ensured. With the thermohydraulic model of the transformer cooled with oil, the behavior of the temperatures in the core, the windings and in the oil is ascertained both in the case of steady-state processes and in the case of transient processes. The suffix "hydraulic" indicates that the hydraulic behavior of the oil is also described by the model.

According to an aspect of the present invention, a method is provided wherein the rate of change of the state variables and the state variables are calculated with differential equations. This aspect is advantageous, since it is the way leading most directly to the aim of ascertaining the rate of change of the state variables.

According to another aspect of the present invention, the measured voltages are used to ascertain the relationship between these voltages and the magnetic flux in the individual parts of the core of the transformer by means of an assignment matrix, and wherein the idling losses are subsequently ascertained in dependence on this magnetic flux by a characteristic curve defined by parameters. The aforementioned aspect makes it possible to calculate on a digital computer the idling losses in the individual parts of the core directly from the terminal voltages.

In yet another aspect of the invention, the transformer-internal winding branches are defined, linked with the measured currents, preferably the terminal currents, by the use of a current assignment matrix. All the currents are represented as a vector with two components because of the necessity to take the phase position into consideration. The amount of the current with which the ohmic losses are calculated via the appropriate resistance is ascertained for each internal winding branch. The distribution of the magnetic leakage flux is ascertained from the distribution of the currents between the individual windings with matrices which are defined both for axial components and for radial components. From the matrices, the eddy-current losses in the windings and the inactive parts of the transformer are ascertained. Also, the relationship between the currents in winding branches and the magnetic leakage flux relevant for the loss-producing branches is ascertained by a matrix, and the eddy-current losses are calculated with factors which are ascertained from the winding geometry. According to the implementational variant discussed above, all the increases in temperature of parts in the transformer caused by the measure currents are ascertained.

In another aspect of the present invention, the matrices and the relevant assignment matrix and ohmic winding resistances are dependent on the switch position. According to a further aspect of the present invention, an initializing operation is carried out with every change, of the switch position, the voltage—magnetic flux assignment matrix, the currents—internal winding currents matrix and the ohmic winding resistances being checked and changed if appropriate. The aspects above take into consideration the influence of the switch position on the distribution of the main magnetic flux the distribution of the internal currents and also on the values of the ohmic resistances of individual winding branches.

In another aspect of the present invention, the status of the cooling units is included in at least one of the parameters of the heat transfer between the oil and the ambience, and the corresponding relationship between the fans and the cooling branches is expressed in an assignment matrix. According to this aspect, the influence of the operating state of the fans on the cooling is described.

According to a further aspect of the present invention, the average temperatures in loss-producing parts of the transformer are calculated with the differential equation:

$$\frac{d}{dt}tqm = \frac{V_{tot} - wim}{cqg}$$

wherein tqm is the average temperature of a loss-producing part of the transformer, $V_{tot}$ is the total losses of the loss-producing part of the transformer, cqg is the thermal capacity of the loss-producing part of the transformer, and wim is the power loss dissipated from the loss-producing part of the transformer to the oil flowing past. This configuration is advantageous, since with this differential equation the average temperatures in loss-producing parts are ascertained in a simple way.

In another aspect of the present invention, the power loss wim dissipated to the oil flowing past is calculated with the formula:

$$wim = V0g \cdot \left(\frac{g}{g0}\right)^{xg}$$

wherein V0g are reference losses, g is the difference between the average temperature of the loss-producing part of the transformer and the average temperature of the oil in contact, referred to as the average jump, g0 is the average jump in the steady state and with the reference losses and xg is the exponent for heat transfer between the loss-producing part of the transformer and the oil, in dependence on the oil temperature and oil velocity. In the case of the aforementioned aspect, it is of advantage that the power loss dissipated to the oil flowing past, this loss being entered into the differential equation for the average temperatures, is ascertained with only a few calculating operations. This power loss is always for that part for which the average temperature is being calculated with the differential equation.

In another aspect of the invention, the hotspot temperatures in loss-producing parts of the transformer are calculated with the differential equation:

$$\frac{d}{dt}tqh = \frac{V_{hot} - wih}{cqh}$$

wherein tqh is the hotspot temperature of a loss-producing part of the transformer, $V_{hot}$ is the total losses of the loss-producing part of the transformer multiplied by a "hotspot factor", cqh is the thermal capacity of the loss-producing part of the transformer converted to the conditions at the location of maximum temperature and wih is the power loss dissipated by the hottest location of the loss-producing part of the transformer to the oil flowing past. This aspect is also of advantage, since the differential equation for the hotspot temperatures in the loss-producing parts has the same calculating operations as that for the average temperatures; if these equations are resolved on a digital computer, the same program steps can be used. The differences at the hotspot in comparison with the average values with regard to generated-power loss, heat transfer and thermal capacity can nevertheless be exactly predetermined via the corresponding parameters.

According to a still further aspect of the present invention, the power loss wih dissipated by a hotspot to the oil flowing past is calculated with the formula:

$$wih = V0h \cdot \left(\frac{h}{h0}\right)^{xh}$$

wherein V0h are reference losses for the hotspot, h is the difference between the maximum temperature of the loss-producing part of the transformer and the oil temperature at the hottest location of the part of the transformer, referred to as the hotspot jump, h0 is the hotspot jump in the steady state and with the reference losses for the hotspot and xh is the exponent for heat transfer between the loss-producing part of the transformer and the oil, in dependence on the oil temperature and oil velocity. The configuration discussed above is also advantageous, because the power loss is always ascertained for that part for which the hotspot temperature is currently being established with the differential equation.

Further aspects of the invention include, wherein the average oil temperatures in branches of the hydraulic network of the oil circuit is calculated with the differential equation $$\frac{d}{dt}tom = \frac{wim - wam - phz \cdot D}{coel_z}$$

wherein tom is the average oil temperature in an oil flow branch, wim is the power loss dissipated by the loss-producing part of the transformer to the oil flowing past, warn is the power loss dissipated by a branch to the ambience, phz is the oil flow through the branch, expressed in transposed thermal output per degree of difference in temperature between the oil temperature at the beginning of the branch and the end of the branch, is the difference in temperature between the oil temperature at the beginning of the branch and the end of the branch and $coel_z$ is the thermal capacity of the oil in the flow branch. In the case of the embodiment above, the average oil temperatures in branches of the hydraulic network of the oil circuit are calculated with a simple differential equation.

According to other aspects of the present invention, the thermal power wam dissipated by a branch to the ambience is calculated with the formula:

$$wam = wam0 \cdot \left(\frac{\overset{\circ}{v}}{\overset{\circ}{v}_0}\right)^{x\overset{\circ}{v}} \cdot fup - VK - sun$$

wherein wam is the reference value of the dissipated thermal power, $\vartheta$ is the difference in temperature between the average oil temperature in the branch and the ambient temperature, $\vartheta_0$ is the reference value for the difference in temperature $\vartheta$ for which the value wam0 is defined, x$\vartheta$ is the exponent for the heat transfer between the oil and the ambience, in dependence on the type cooling, fup is a factor for the influence of the ambient temperature and if appropriate the air pressure, VK is the leakage power loss in the tank, and if appropriate of a cooler branch which represents a surface of the tank, and sun is the power of the solar irradiation. According to this advantageous development, the thermal power dissipated to the ambience from that branch for which the average oil temperature is subsequently established with the differential equation is ascertained.

According to another aspect of the present invention, the average oil temperatures in nodes of the hydraulic network of the oil circuit is calculated with the differential equation:

$$\frac{d}{dt}tok = \frac{\sum_{i=1}^{n_z} phz \cdot T_{eff}}{coel_K}$$

wherein tok is the average oil temperature in a node, $n_z$ is the number of branches which enter at this node, phz is the oil flow through one of the entry branches, $T_{eff}$ is the temperature of the oil at the end of the branch connected to the node, which is essentially dependent on the direction of flow, and $coel_k$ is the thermal capacity of the oil in this node. The development discussed above is also of advantage, this providing that the average oil temperature in a node is ascertained, with inclusion of the oil flow, using that oil flow which was already used in the calculation of the average oil temperature through one of the entering branches.

According to another aspect of the present invention, the differential equations are resolved by a known numerical method, for example the method, according to Runge-Kutta. This development is absolutely necessary because of the frequently occurring nonlinear relationships and the method of calculation of the individual temperatures, which is partly dependent on the direction of flow of the oil.

In yet another aspect of the present invention the branches and also the nodes are assigned a certain oil volume, which together corresponds to the total oil volume. A design as described above, in which checking of the hydraulic network is carried out, is also advantageous.

In another aspect of the present invention, when resolving the differential equations for the average oil temperatures (tom) in the branches and in the nodes of the hydraulic network of the oil circuit, the state of flow is continuously also calculated by a system of equations for the pressure drops in all the branches of the entire hydraulic network. In this embodiment, the state of flow, described by the branch variables phz, which can change in the hydraulic network on account of transient processes, is continuously calculated at the same time.

According to a further aspect of the present invention, for each branch in the hydraulic network, the vector for a virtual driving pressure difference f is ascertained:

$$f = g \cdot \rho \cdot \beta \cdot \Delta H \cdot T + pd$$

wherein f is the driving pressure difference, g is the acceleration due to gravity, $\rho$ is the density of the oil, $\beta$ is the coefficient of expansion of the oil, $\Delta H$ is the difference in height between the starting point and end point of the branch is the average temperature of the oil in the branch and pd is, if there is one, the pressure difference caused by a pump in the branch, and wherein the vector $\phi$ of the oil flow in the individual branches is calculated with the matrix equation $\phi = TTRTT \cdot f$, TTRTT being a matrix which contains the information on the hydraulic resistances in all the branches and on the structure of the hydraulic network. This aspect, with which the driving pressure differences in the flow branches, and from them the flow vectors in individual branches, are ascertained, is also of advantage. The flow of the oil in the hydraulic network is determined by the hydraulic resistances of the individual flow branches, by the distribution of the temperatures of the oil and, if there are any, by the pressure and flow characteristic of pumps.

In another aspect of the present invention, the vectors $\phi$ of the oil flow are ascertained in an iterative process, this process being continued until the initial value and result coincide with adequate accuracy. This development is necessary, since the hydraulic resistances are non-linear.

According to a still further aspect of the present invention, a continuous adaptation of parameters is carried out with two auxiliary variables, one auxiliary variable taking into consideration the dependence of the losses on the temperature (tqm, tqh, tom, tok) and the second auxiliary variable taking into consideration the dependence of the oil flow on the temperature (tqm, tqh, tom, tok), and wherein the non-linear behavior of the oil flow with regard to the pressure drop and flow rate is simulated by a feedback from the oil flow via the hydraulic resistances. The aforementioned aspect, by which the hydraulic resistances in the branches and nodes of the hydraulic network enter in the ascertainment of the vectors of the oil flow in the branches, is also advantageous.

Other aspects of the present invention include, wherein the temperature dependence of the specific resistance of the conductor material is taken into consideration in a return path of the state variables constituted by temperatures to the auxiliary variables constituted by losses. This configuration makes it possible in the calculation of the ohmic and eddy-current losses in a loss-producing part for a given winding current and given leakage flux distribution for the temperature of this part also to be included.

Further aspects include, wherein a feedback of the state variables constituted by temperatures to the hydraulic resistances or to the oil flow is carried out in the thermohydraulic model, the totality of all the oil flows, represented by the vector $\phi$, being temperature-dependent in two ways, namely on the one hand on the driving pressure difference and on the other hand on the viscosity of the oil and consequently the hydraulic resistances. According to this aspect, the temperature dependence of the oil flow is taken into consideration in the thermohydraulic model.

Further aspects of the invention include, an arrangement for carrying out the method, wherein a digital computer is provided and ascertains the thermohydraulic model, with memory units in which the algorithms for the thermohydraulic model are stored, to which computer at least one input keyboard, at least one display device, in particular a screen, and interfaces for preparing the input variables is or are connected. This arrangement has the advantage that it is a common personal computer, in which only the appropriate interfaces have to be installed. The computer should have at least a computer processor (i.e. PENTIUM) with a very high clock frequency.

According to an aspect of the present invention, a method for ascertaining state variables in an oil-cooled transformer is provided. The method includes measuring input variables input variables; establishing a state or status of cooling units affiliated with the transformer; feeding the measurements of the input variables, and state or status of the cooling units into a thermohydraulic model; calculating a present value of state variables in the thermohydraulic model with auxiliary variables, and with a hydraulic network of an oil circuit of the transformer, having a plurality of branches and nodes; calculating a change over time of the state variables; and calculating new state variables based upon the change over time of at least one of the input variables and the status of the cooling units.

According to another aspect of the present invention, the state variables are temperatures. In yet another aspect of the present invention, the state variables include at least one of average temperature of at least one loss-producing part of the transformer, a hotspot temperature in the at least one loss-producing part of the transformer, an average oil temperature of at least one branch of a hydraulic network of the oil circuit, and an average temperature of at least one node of the hydraulic network of the oil circuit.

In another aspect of the present invention, the average temperature in the at least one loss-producing part of the transformer is calculated with the following differential equation:

$$\frac{d}{dt}tqm = \frac{V_{tot} - wim}{cqg}$$

wherein tqm is an average temperature of the least one loss-producing part, $V_{tot}$ is a total loss of the at least one loss-producing part, cqg is thermal capacity of the at least one loss-producing part, and wim is power loss dissipated from the at least one loss-producing part to oil flowing past the at least one loss-producing part.

In another aspect of the present invention, the power loss wim dissipated to the oil flowing past the at least one loss-producing part is calculated with the formula:

$$wim = V0g \cdot \left(\frac{g}{g0}\right)^{xg}$$

wherein V0g are reference losses, g is a difference between an average temperature of the at least one loss-producing part and an average temperature of oil in contact with the at least one loss-producing part, referred to as average jump, g0 is average jump in a steady state and with the reference losses and xg is an exponent for heat transfer between the at least one loss-producing part and the oil as a function of the oil temperature and oil velocity.

According to a further aspect of the present invention, the hotspot temperature in the at least one loss-producing part of the transformer is calculated with the differential equation:

$$\frac{d}{dt}tqh = \frac{V_{hot} - wih}{cqh}$$

wherein tqh is the hotspot temperature of the at least one loss-producing part, $V_{hot}$ is a total loss of the at least one loss-producing part multiplied by a "hotspot factor", cqh is thermal capacity of the at least one loss-producing part converted to conditions at a location of maximum temperature, and wih is power loss dissipated by a hottest location of the at least one loss-producing part to oil flowing past the at least one loss-producing part.

In another aspect of the present invention, the power loss wih dissipated by the hotspot to the oil flowing past the at least one loss-producing part is calculated with the formula:

$$wih = V0h \cdot \left(\frac{h}{h0}\right)^{xh}$$

wherein V0h are reference losses for the hotspot, h is a difference between a maximum temperature of the at least one loss-producing part and the oil temperature at the hottest location of the at least one loss-producing part, referred to as hotspot jump, h0 is hotspot jump in the steady state and with the reference losses for the hotspot, and xh is an exponent for heat transfer between the at least one loss-producing part and the oil as a function of the oil temperature and oil velocity.

In another aspect of the present invention, the average oil temperature in the at least one branch of the hydraulic network of the oil circuit is calculated with the differential equation:

$$\frac{d}{dt}tom = \frac{wim - wam - phz \cdot D}{coel_z}$$

wherein tom is an average oil temperature of the at least one oil flow branch, wim is power loss dissipated by the at least one loss-producing part to oil flowing past the at least one loss-producing part, wam is power loss dissipated by the at least one branch to ambient temperature, phz is the oil flow through the at least one branch, expressed in transposed thermal output per degree of difference in temperature between the oil temperature at a beginning of the at least one branch and the oil temperature at an end of the at least one branch, D is a difference in temperature between the oil temperature at the beginning of the at least one branch and the oil temperature at the end of the at least one branch, and $coel_z$ is the thermal capacity of the oil in the at least one branch.

According to a still further aspect of the present invention, the thermal power warn dissipated by the at least one branch to ambient temperature is calculated with the formula:

$$wam = wam0 \cdot \left(\frac{\mathring{v}}{\mathring{v}_0}\right)^{x\mathring{v}} \cdot fup - VK - sun$$

wherein wam0 is a reference value of the dissipated thermal power, $\mathring{v}$ is a difference in temperature between average oil temperature in the at least one branch and the ambient temperature, $\mathring{v}_0$ is a reference value for a difference in temperature $\mathring{v}$ for which the value wam0 is defined, $\mathring{v}$ is an exponent for heat transfer between the oil and ambient temperature, as a function of the manner of cooling, fup is a factor for at least one of the influence of the ambient temperature and if appropriate the air pressure, VK is leakage power loss in at least one of a tank of the transformer and a cooler branch which represents a surface of the tank, and sun is the power of solar irradiation on the tank.

Further aspects of the present invention include, wherein the average oil temperature in the at least one node of the hydraulic network of the oil circuit is calculated with the differential equation:

$$\frac{d}{dt}tok = \frac{\sum_{i=1}^{n_z} phz \cdot T_{\mathit{eff}}}{coel_K}$$

wherein tok is an average oil temperature in at least one node, $n_z$ is a number of branches which enter the at least one node, phz is the oil flow through at least one entry branch, $T_{\mathit{eff}}$ is the temperature of the oil at an end of at least one branch connected to the at least one node, which is dependent on direction of flow, and $coel_k$ is thermal capacity of the oil in the at least one node.

According to other aspects of the present invention, for each individual branch in the hydraulic network, a vector for a virtual driving pressure difference f, is defined by the equation:

$$f = g \cdot \rho \cdot \beta \cdot \Delta H \cdot T + pd$$

wherein f is the driving pressure difference, g is acceleration due to gravity, ρ is the density of the oil, β is a coefficient of expansion of the oil, ΔH is a difference in height between a starting point and an end point of the branch, T is an average temperature of the oil in the branch, and pd is a pressure difference caused by a pump in the branch, and wherein a vector φ of a totality of all the oil flow in the individual branches is calculated with the matrix equation:

$$\phi = TTRTT \cdot f,$$

wherein TTRTT defines a matrix which contains information on hydraulic resistances in all the branches and on structural characteristics of the hydraulic network.

Other aspects of the present invention include, ascertaining the vector φ of the oil flow is in an iterative process which is continued until an initial value and result coincide with a predetermined adequate accuracy. According to another aspect of the present invention, a feedback of the state variables constituted by temperatures of at least one of the hydraulic flow resistances or the oil flow is carried out in the thermohydraulic model, the totality of all the oil flows, represented by the vector φ, being temperature-dependent in two ways, on one hand on a driving pressure difference and on the other hand on the viscosity of the oil and consequently the hydraulic flow resistances.

According to a further aspect of the present invention, when resolving differential equations for the average oil temperature in the at least one branch and in the at least one node of the hydraulic network of the oil circuit, the state of flow is also continuously calculated by a system of equations for pressure drops in all the branches of the entire hydraulic network.

According to a still further aspect of the invention, a continuous adaptation of parameters is carried out with two auxiliary variables, a first auxiliary variable taking into consideration a dependence of the losses on the temperature and a second auxiliary variable taking into consideration a dependence of the oil flow on the temperature, and wherein non-linear behavior of the oil flow with regard to pressure drop and flow rate is simulated by a feedback from the oil flow via the hydraulic resistances.

According to another aspect of the present invention, a temperature dependence of a specific resistance of conductor material is taken into consideration in a return path of the state variables constituted by temperatures to the auxiliary variables constituted by losses. In yet another aspect of the present invention, the input variables comprise at least one of voltages at terminals of the transformer, currents in windings of the transformer, and ambient temperature surrounding the transformer.

In another aspect of the present invention, the voltage measurements are used to ascertain a relationship between the voltages and magnetic flux leakage in individual parts of a core of the transformer by the use of a voltage-magnetic leakage flux assignment matrix, and wherein idling losses are subsequently ascertained in as a function of the magnetic flux leakage by a characteristic curve defined by predetermined parameters.

According to a further aspect of the present invention, internal winding branches of the transformer are defined, linked with the current measurements, by the use of a current assignment matrix, all the current measurements being represented as a vector with two components such that phase position is taken into consideration, and wherein an amount of current with which ohmic losses are calculated, via an appropriate resistance, is ascertained for each internal winding branch, and wherein distribution of magnetic flux leakage is ascertained from a distribution of currents between individual windings with matrices which are defined both for axial components and for radial components, and from the matrices eddy-current losses in the individual windings and in inactive parts of the transformer are ascertained, and wherein a relationship between the currents in the internal winding branches and the magnetic flux leakage relevant for loss-producing branches is ascertained by a currents-internal windings currents matrix, and the eddy-current losses are calculated with factors which are ascertained from winding geometry of the transformer.

In another aspect of the present invention, the voltage-magnetic leakage flux assignment matrix, the currents-internal winding currents matrix, and the ohmic winding resistances are checked and changed if appropriate. According to a still further aspect of the present invention, the matrices, the relevant assignment matrix, and ohmic winding resistances are dependent on the at least one switch position.

Other aspects of the invention include, taking the current measurements at the terminals of the transformer. Further aspects of the invention include, providing a digital computer which ascertains the thermohydraulic model, with memory units in which algorithms for the thermohydraulic model are stored, to which computer comprises at least one input keyboard, at least one display device, and at least one interface for preparing the input variables is connected.

According to other aspects of the present invention, the at least one display device includes a screen. According to another aspect of the present invention, the cooling units include at least one of fans and pumps. According to a still further aspect of the invention, the state or status of the cooling units is included in at least one of (1) in parameters of heat transfer between the oil of the transformer and ambient temperature, and (2) in a corresponding relationship between the cooling units and cooling branches, which is expressed in an assignment matrix.

In yet another aspect of the present invention, a rate of change of the state variables and the state variables is calculated with differential equations. In another aspect of the present invention, the differential equations are resolved by numerical methodology according to Runge-Kutta. According to a further aspect of the present invention, a position of at least one switch of the transformer is fed into the thermohydraulic model as one of the state variables. In another aspect of the present invention, an initializing operation is carried out with every change of the position of the at least one switch. According to another aspect of the present invention, the at least one switch includes a stepping switch.

Other aspects of the present invention include, adapting the auxiliary variables as a function of a present value of the state variables when there is a change in at least one of the input variables, the state or status of the cooling units, and the at least one switch position. Further aspects of the present invention include, wherein the auxiliary variables include at least one of losses in the transformer, parameters for heat transfer, flow resistances and the flow or flow rates in the oil circuit. According to another aspect of the invention, the branches and nodes are assigned a certain oil volume, which together corresponds to a total oil volume.

According to another aspect of the invention, a method for ascertaining state variables, in particular temperatures, in an oil-cooled transformer, is provided. The method includes measuring input variables comprising at least one of voltages at transformer terminals, currents in windings and ambient temperature; defining at least one of a state of cooling units of the transformer comprising at least one of fans and pumps, and a position of at least one switch; feeding the input variables and the status of the cooling units and the position of the at least one switch into a thermohydraulic model; calculating state variables in the thermohydraulic model with auxiliary variables which comprise at least one of losses in the transformer, parameters for heat transfer, flow resistances and flow or flow rates in an oil circuit and a hydraulic network of the oil circuit which has branches, wherein the state variables comprise at least one of average temperatures and hotspot temperatures in loss-producing parts of the transformer, and average oil temperatures in branches and in nodes of the hydraulic network of the oil circuit; adapting the auxiliary variables as a function of the present value of the state variables when there is a change in at least one of the input variables and the status of at least one of the cooling units and the switch position; calculating a change over time of the state variables; and calculating new state variables based upon the change over time of at least one of the input variables, the state of the cooling units, and the position of the at least one switch.

Other exemplary embodiments and advantages of the present invention may be ascertained by reviewing the present disclosure and the accompanying drawing.

BRIEF DESCRIPTION OF THE DRAWINGS

The invention is explained in more detail below on the basis of the exemplary embodiments represented in the drawings, in which.

DETAILED DESCRIPTION OF THE PRESENT INVENTION

Figure 1:
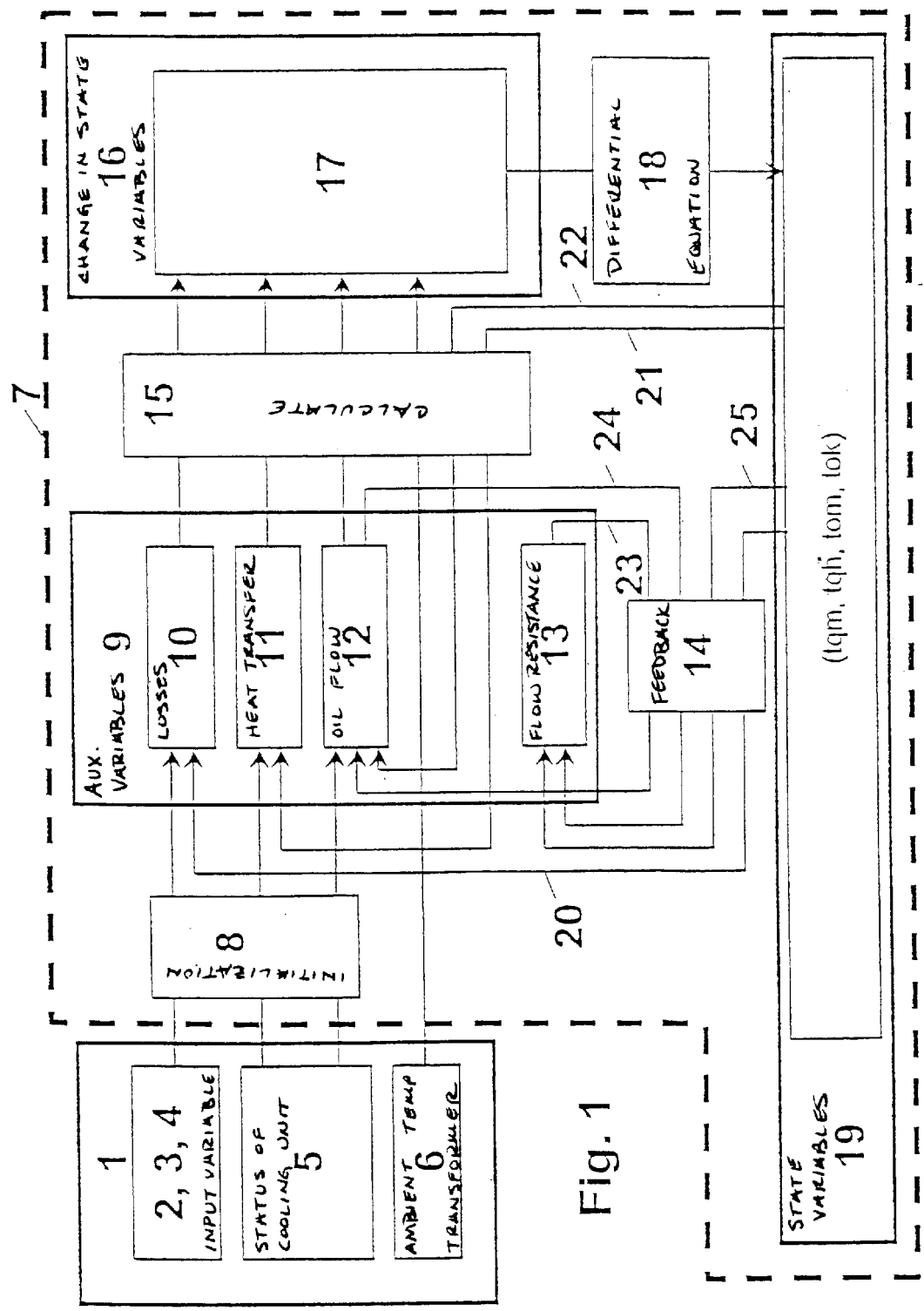
FIG. 1 shows the structure of the thermohydraulic model as a block diagram

It is firstly stated that, in the variously described exemplary embodiments, the same parts are provided with the same reference numerals or with the same component designations, disclosures contained anywhere in the description being applicable analogously to the same parts with the same reference numerals or the same component designations. Also, the terms chosen in the description for indicating positions, for example upper, lower, lateral etc., refer to the figure directly being described and shown and, when there is a change in position, are applicable analogously to the new position. Furthermore, individual features or combinations of features from the various exemplary embodiments shown and described can also represent solutions which are in themselves independent, inventive or in accordance with the invention.

In FIG. 1, the input variables are represented as a block; they are the terminal voltages 2 at the transformer, the currents 3 in the windings, the switch positions 4 of a stepping switch, the state or status 5 of the cooling units and the ambient temperature 6 of the transformer. The state of the cooling units indicates how many and which fans are in operation, and their rotational speed, how many and which pumps are switched on and their power consumption. In the thermohydraulic model 7, the block 8 defines an initialization before a new start of the sequence in the thermohydraulic model 7, which takes place either when there is a change in the voltage 2, the current 3, the switch position 4 of the stepping switch and/or the status 5 of the cooling units or at regular intervals. In the block 9, the auxiliary variables 9 are ascertained; these are the losses 10 in the transformer 4, in the windings, in the steel components, such as housings, press bolts, etc., the parameters 11 for the heat transfer, the flow resistances 13 in the oil circuits and the oil flow 12 itself. The block 15 schematizes the calculation of the differential quotients for the temperatures tqm, tqh, tom, tok. The block 16—change in state variables—describes the differential change in the temperatures tqm, tqh, tom, tok. The numeric resolution of the differential equations is represented by the block 18. In the block 19, the state variables 19 of the temperatures tqm, tqh, tom, tok are stored. The block 14 represents a continuous parameter adaptation 14 by use of an appropriate feedback.

Figure 2:
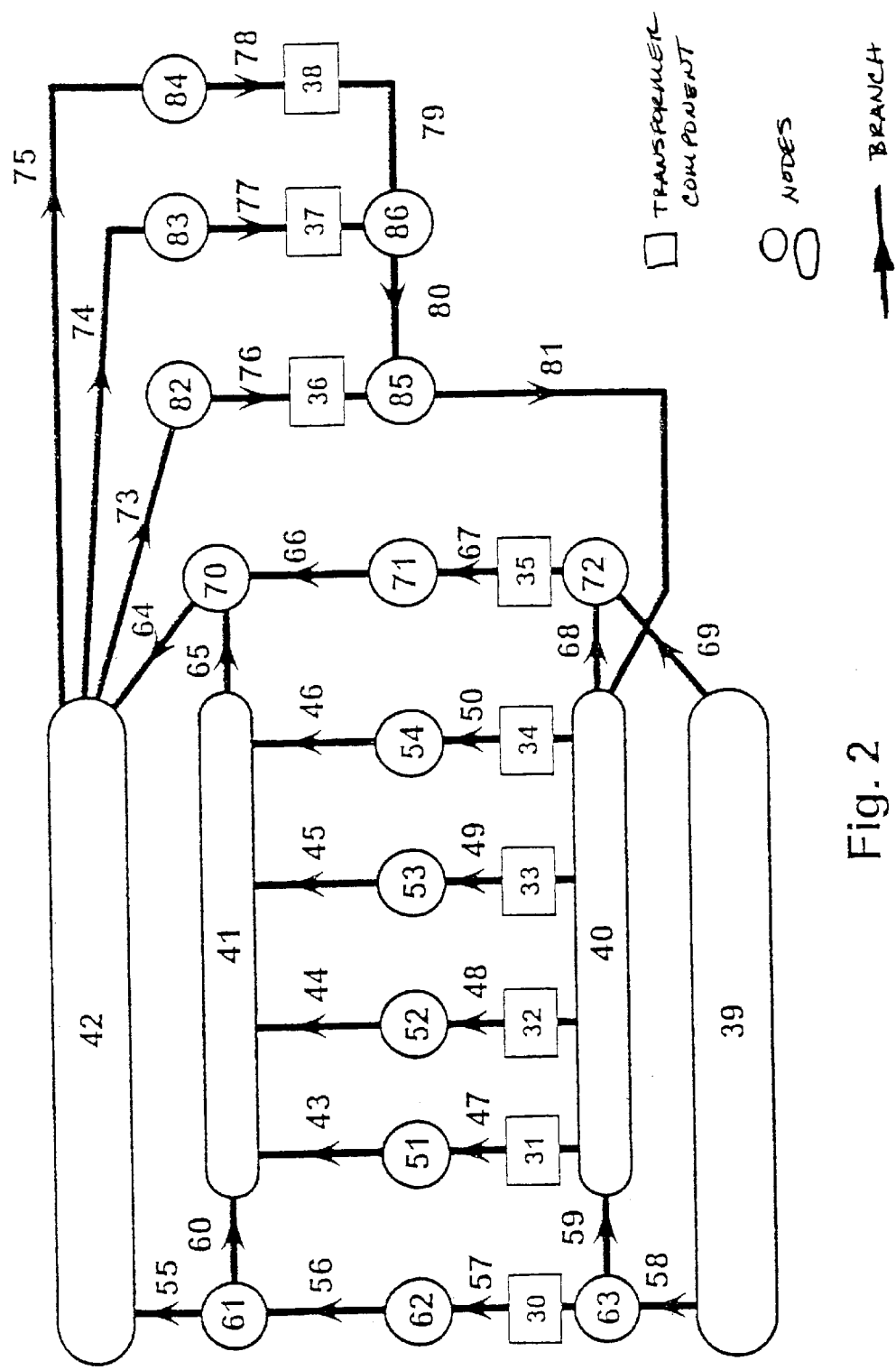
FIG. 2 shows the structure of the hydraulic network for the thermohydraulic model.

The squares in the hydraulic network of the transformer in FIG. 2 symbolize in sequence the transformer core 30, the low-voltage windings 31, the main windings 32, the coarse-step windings 33, the fine-step windings 34, the transformer tank 35 and coolers 36, 37, 38, in particular the fans. The circles and elongate circles are the nodes and the connections between them are the branches. The node 39 is in the bottom part of the transformer tank 35, the node 40 is at the lower ends of the windings 31, 32, 33, 34, the node 41 is at the upper ends of said windings and the node 42 is in the tank 35 above the transformer. The branches 43, 44, 45, 46, 47, 48, 49, 50 are the flows through the windings 31, 32, 33, 34 with the converging and branching nodes 51, 52, 53, 54.

The transformer core 30 and also the transformer tank are likewise included in the hydraulic network, the branches 55, 56, 57, 58, 59, 60 and the nodes 61, 62, 35 63 being provided for the core 30 and the branches 64, 65, 66, 67, 68, 69 and the nodes 70, 71, 72 being provided for the tank 35.Furthermore, the oil flow to and from the coolers 36, 37, 38 is likewise represented by branches 73, 74, 75, 76, 77, 78, 79, 80, 81 and nodes 82, 83, 84, 85, 86.

All the data values which are processed in the thermohydraulic model 7 can be divided into four categories:

1.) Input variables 1, which are, inter alia, sensed measured values 2, 3
2.) Internal auxiliary variables 9
3.) State variables 19 These are temperatures tqm, tqh, tom, tok, which fully describe the thermal state at a specific point in time.
4.) Changes in the state variables 16 Since the behavior of the model 7 is described by differential equations, the changes in the state variables 19 or their rate of change play a significant role.

The input variables 1 are data measure directly by sensors and transformed of measured-value converters into a form which can be read by the computer program with which the method is realized. These input variables are voltages 2 at transformer terminals, currents 3 in windings, switch positions 4 of a stepping switch, the status 5 (on/off) of pumps and fans and the ambient temperature.

The auxiliary variables 9 are required for ascertaining the temperature behavior. In some cases they additionally also have an informative value for the operator of the transformer. These variables 9 are calculated from the input variables 1, from the state at a given moment and from fixed transformer data determined from the geometry and from material properties.

The state variables 19 or changes in state variables 16 describe the temperature state of the transformer at a given instant. These are the temperature tqm, which is the average temperature of loss-producing parts, such as the core, windings, etc., the temperature tqh, which is the hotspot temperature in loss-producing parts, the temperature tom, which is the average oil temperature in the branches, for example 43, 44, of the hydraulic network, and the temperature tok, which is the average oil temperature in the nodes, for example 51, 52, of the hydraulic network. These temperatures tqm, tqh, tom, tok are present in the model 7 at every point in time. The actual computing work in the model 7 concerns the changes of these temperatures tqm, tqh, tom, tok; therefore, from the viewpoint of the information flow, the category of the change in state variables 16 also lies between the auxiliary variables 9 and the actual state variables 19.

The computing work within the model 7 is also subdivided into individual categories. The primary distinguishing feature is the frequency with which a certain algorithm is activated. In the structure of the thermohydraulic model 7 in FIG. 1, this data processing is represented by those rectangles which are passed through by the data flows. Called up the least often is the initialization 8. An initialization 8 must in principle take place only if some value or other of the input variables 1 changes significantly.

In practice, an initialization always takes place at the beginning of a computing operation, which is triggered either at regular intervals or by the change of an input parameter 2, 3, 4, 5, 6.

During the initialization 8, the basic parameters of the losses 10 are ascertained from the values for the voltage 2 and current 3; similarly, the position 4 of the stepping switch has an influence on the distribution of the losses 10 between the individual windings 31, 32, 33, 34.

A cutting in or out of fans or pumps has the consequence of changing the heat transfer parameters 11, which is likewise taken into consideration as part of the initialization 8.

A further category in the computing work is the continuous adaptation 14 of parameters. Virtually all the major parameters of the thermohydraulic model 7 are strongly dependent on the temperature tqm, tqh, tom, tok. If the temperature tqm, tqh, tom, tok changes during a computing operation, these parameters must be recalculated at regular intervals. This concerns flow resistances 13 and the oil flow 12 in particular, and also the losses 10, since both their ohmic component and the eddy-current component are dependent on the temperature tqm, tqh, tom, tok. This is represented by return paths 20, 21, 22, 23, 24, 25 in FIG. 1.

The time interval between two parameter adaptations 14 can be set, it being necessary in large-scale systems to find a compromise between maximum accuracy and adequate computing speed.

A third category is the calculation of the differential quotients 15 and the numerical resolution of the differential equations 18. This is a simulation process, which requires the greatest proportion of computing power. Here, the change over time of all the state variables 19, i.e. all the temperatures tqm, tqh, tom, tok in the transformer, is calculated in small time increments, dependent on the time constants of the model 7.

The differential quotients result from the physical laws of heat storage and heat transfer. A known numerical method, for example the method according to Runge-Kutta, is used as the mathematical method for resolving the differential equations 18.

The measured terminal voltages 2 are required to ascertain the proportion of idling losses 10 in the individual parts of the core 30 via the main magnetic flux. For this purpose, an assignment matrix is used, describing the relationship between the terminal voltages 2 and the magnetic flux in the individual parts of the core. The losses 10 are then ascertained in dependence on this flux with the aid of a characteristic curve defined by just a few parameters.

The measured currents 3 have an influence on the ohmic component of the winding losses, the eddy-current component of the winding losses, which is significant in the consideration of hotspots, and additional leakage losses in inactive parts, such as the press structure and tank 35.

When creating the model 7, internal winding branches are defined, linked with the measurable terminal currents 3 by means of a current assignment matrix. In principle, when ascertaining the influence of the flows 3, the mutual phase position of the individual winding currents must be taken into consideration, which means that all the currents must be represented as vectors with two components. In the case of transformers with more than two winding systems, this is not trivial.

For the ohmic losses 10, the amount of the associated current is ascertained for each internal winding branch and is then used to calculate the losses 10 via the corresponding ohmic resistance.

For ascertaining the eddy-current losses in the windings 31, 32, 33, 34 and in the inactive parts of the transformer, initially the distribution of the magnetic leakage flux must be derived from the distribution of the currents between the individual windings 31, 32, 33, 34. This takes place with so-called leakage flux matrices, which have to be defined both for the axial components and for the radial components. Here, too, consideration for the phase position is essential, for which reason the vector representation with two components is again required.

A leakage flow matrix describes the relationship between the currents in internal winding branches and the magnetic leakage fluxes relevant for the individual loss-producing branches. If the amounts of these leakage fluxes are known, the components of the eddy-current losses can be calculated via corresponding factors, which result from the winding geometry.

The switch position 4 of a stepping switch may in principle have an influence on the distribution of the main magnetic flux, the distribution of the internal currents and also on the values of the ohmic resistances of individual winding branches. This influence is taken into consideration by making the corresponding components of the assignment matrices described above dependent on the switch position. For taking into consideration the change in ohmic resistances, the corresponding values of the ohmic winding resistances must also be dependent on the switch position. In the practical implementation of an initializing operation 8, this means that, with every change of the switch position 4, the elements of the terminal voltage 2—magnetic flux assignment matrix, of the terminal currents 3—internal winding currents assignment matrix and of the ohmic winding resistances must be checked and changed if appropriate before the computing operations for loss calculation 10 described above are carried out.

A switched-on pump is taken into consideration by incorporating the corresponding pump characteristic, that is the relationship between the pressure difference between the inlet and outlet of the pump and the oil flow through the pump, into the hydraulic network for describing the oil flow 12 or ϕ or phz.

The cutting in or out of a fan has an influence on one of the parameters of the heat transfer 11 between the oil and the ambience. In principle, each branch, for example 73, 76, 81, with external cooling contains a component which is dependent on the operating state of the fans. The corresponding relationship is described by an assignment matrix between fans and cooling branches, for example 73, 76, 81.

The ambient temperature 6, which may also be a number of ambient temperatures, has a direct influence on the heat flow between a branch, for example 73, 76, 81, with external cooling and the ambience. This can be seen from the differential equation for the average temperature tom of the oil in a branch, for example 73, 76, 81, where the temperature difference Θ between the average oil temperature in the branch and the ambient temperature enters directly into the expression.

In the continuous adaptation 14 of computing parameters, essentially two dependences of auxiliary variables 9 are reproduced, namely the dependence of the losses 10 and the oil flow 12 on the temperature tqm, tqh, tom, tok. This is represented by the return paths 20 and 22 in FIG. 1. In addition, the non-linear behavior of the oil flow 12 or ϕ or phz with regard to the pressure drop and flow rate is simulated by a corresponding feedback 23, 24 from the oil flow 12 to the auxiliary variable 9 of hydraulic flow resistances 13.

With a given winding current and given leakage flux distribution, both the ohmic losses and the eddy-current losses are dependent on the temperature tqm, tqh, tom, tok of the source of the loss. In both cases, the cause is the temperature dependence of the specific resistance of the conductor material, which with increasing temperature normally likewise increases. For the ohmic losses, this means that they increase with increasing temperature tqm, while the eddy-current losses decrease with increasing temperature tqm. This dependence is taken into consideration in a return path 20 of the state variables 19 constituted by temperature tqm, tqh, tok, to the auxiliary variables 9 constituted by losses 10.

The flow 12 or ϕ or phz of the oil in a given hydraulic network is determined by the hydraulic resistances 13 of the individual flow branches, for example 43, 44, by the distribution of the temperatures of the oil, and, if there are any, by the pressure/flow characteristics of pumps.

In the thermohydraulic model 7, this actually takes place by the following method: In the first step, a virtual driving pressure difference f is ascertained for each flow branch, for example 43, 44. With the ascertained vector f of the driving pressure differences, the vector p or phz of the flow is then calculated with a matrix equation in the individual branches, for example 43, 44. The matrix for the calculation of the vector ϕ or phz contains the information on the hydraulic resistances 13 of all the branches, for example 43, 44, and on the structure of the hydraulic network.

There are different types for hydraulic resistances, dependent on the actual geometry. For example, pipelines have a different characteristic than flow branches or diversions. Independently of this, in many cases it is so that the hydraulic resistance 13 is dependent on the flow rate. This means that the result of the evaluation of the matrix equation for calculating the vector ϕ or phz of the flow has an influence on the matrix used in this case, since the momentary values of the hydraulic resistances 13 are contained in it. As a further consequence, this means that the ascertainment of the oil flows ϕ or phz must take place in an iterative process. Starting from an initial value $\phi_0$ for the vector ϕ, hydraulic resistances 13 are calculated, and consequently a new vector $\phi_1$. The difference between $\phi_0$ and $\phi_1$ is used for calculating a new, improved value for ϕ. This method is continued until the initial value and the result coincide with adequate accuracy.

The totality of all the oil flows, represented by the vector ϕ, is temperature-dependent in two ways:

1.) The average temperature T or tom of the cooling medium in the flow branch, for example 43, 44, is contained directly in the expression for the driving pressure difference f.

2.) The viscosity of oil, and consequently the hydraulic resistance 13 of a flow branch, for example 43, 44, is very strongly dependent on the temperature.

The two above laws are contained in the thermohydraulic model 7 in the form of a suitable return path 25 of the state variables of temperature tom, tok to the hydraulic resistances 13 or the oil flow 12.

This method for ascertaining temperatures and temperature changes in an oil-cooled transformer, which is usually a three-phase transformer, is an essential part of a "transformer monitoring" system.

The object on which the independent inventive solutions are based can be deduced from the above description.

What is claimed is:

1. A method for ascertaining state variables in an oil-cooled transformer, comprising:

measuring input variables;

establishing a state or status of cooling units affiliated with the transformer;

feeding the measurements of the input variables, and state or status of the cooling units into a thermohydraulic model;

calculating a present value of state variables in the thermohydraulic model from auxiliary variables and from a hydraulic network of an oil circuit of the transformer, which includes a plurality of branches and nodes that are part of the thermohydraulic model;

calculating a change over time of the state variables; and calculating new state variables based upon the change over time of at least one of the input variables and the status of the cooling units.

2. The method according to claim 1, wherein the state variables are temperatures.

3. The method according to claim 2, wherein a temperature dependence of a specific resistance of conductor material is taken into consideration in a return path of the state variables constituted by temperatures to the auxiliary variables constituted by losses.

4. The method according to claim 1, wherein the auxiliary variables comprise at least one of losses in the transformer, parameters for heat transfer, flow resistances and the flow or flow rates in the oil circuit.

5. The method as according to claim 1, wherein a rate of change of the state variables and the state variables are calculated with differential equations.

6. The method according to claim 5, wherein the differential equations are resolved by numerical methodology according to Runge-Kutta.

7. The method according to claim 1, wherein the cooling units comprise at least one of fans and pumps.

8. The method according to claim 7, wherein the state or status of the cooling units is included in at least one of (1) in parameters of heat transfer between the oil of the transformer and ambient temperature, and (2) in a corresponding relationship between the cooling units and cooling branches, which is expressed in an assignment matrix.

9. The method according to claim 1, wherein a position of at least one switch of the transformer is fed into the thermohydraulic model as one of the state variables.

10. The method according to claim 9, wherein an initializing operation is carried out with every change of the position of the at least one switch.

11. The method according to claim 9, wherein the at least one switch comprises a stepping switch.

12. The method according to claim 9, wherein the auxiliary variables are adapted as a function of a present value of the state variables when there is a change in at least one of the input variables, the state or status of the cooling units, and the at least one switch position.

13. The method according to claim 12, wherein the branches and nodes are assigned a certain oil volume, which together corresponds to a total oil volume.

14. The method according to claim 2, wherein the state variables comprise at least one of average temperature of at least one loss-producing part of the transformer, a hotspot temperature in the at least one loss-producing part of the transformer, an average oil temperature of at least one branch of a hydraulic network of the oil circuit, and an average temperature of at least one node of the hydraulic network of the oil circuit.

15. The method according to claim 14, wherein, when resolving differential equations for the average oil temperature in the at least one branch and in the at least one node of the hydraulic network of the oil circuit, the state of flow is also continuously calculated by a system of equations for pressure drops in all the branches of the entire hydraulic network.

16. The method according to claim 14, wherein the average oil temperature in the at least one node of the hydraulic network of the oil circuit is calculated with the differential equation:

$$\frac{d}{dt}tok = \frac{\sum_{i=1}^{n_z} phz \cdot T_{eff}}{coel_K}$$

wherein tok is an average oil temperature in at least one node, $n_z$ is a number of branches which enter the at least one node, phz is the oil flow through at least one entry branch, $T_{eff}$ is the temperature of the oil at an end of at least one branch connected to the at least one node, which is dependent on direction of flow, and $coel_K$ is thermal capacity of the oil in the at least one node.

17. The method according to claim 14, wherein the hotspot temperature in the at least one loss-producing part of the transformer is calculated with the differential equation:

$$\frac{d}{dt}tqh = \frac{V_{hot} - wih}{cqh}$$

wherein tqh is the hotspot temperature of the at least one loss-producing part, $V_{hot}$ is a total loss of the at least one loss-producing part multiplied by a "hotspot factor", cqh is thermal capacity of the at least one loss-producing part converted to conditions at a location of maximum temperature, and wih is power loss dissipated by a hottest location of the at least one loss-producing part to oil flowing past the at least one loss-producing part.

18. The method according to claim 17, wherein the power loss wih dissipated by the hotspot to the oil flowing past the at least one loss-producing part is calculated with the formula:

$$wih = V0h \cdot \left(\frac{h}{h0}\right)^{xh}$$

wherein V0h are reference losses for the hotspot, h is a difference between a maximum temperature of the at least one loss-producing part and the oil temperature at the hottest location of the at least one loss-producing part, referred to as hotspot jump, h0 is hotspot jump in the steady state and with the reference losses for the hotspot, and xh is an exponent for heat transfer between the at least one loss-producing part and the oil as a function of the oil temperature and oil velocity.

19. The method according to claim 14, wherein the average oil temperature in the at least one branch of the hydraulic network of the oil circuit is calculated with the differential equation:

$$\frac{d}{dt}tom = \frac{wim - wam - phz \cdot D}{coel_z}$$

wherein tom is an average oil temperature of the at least one oil flow branch, wim is power loss dissipated by the at least one loss-producing part to oil flowing past the at least one loss-producing part, wam is power loss dissipated by the at least one branch to ambient temperature, phz is the oil flow through the at least one branch, expressed in transposed thermal output per degree of difference in temperature between the oil temperature at a beginning of the at least one branch and the oil temperature at an end of the at least one branch, D is a difference in temperature between the oil temperature at the beginning of the at least one branch and the oil temperature at the end of the at least one branch, and $coel_z$ is the thermal capacity of the oil in the at least one branch.

20. The method according to claim 19, wherein the thermal power wam dissipated by the at least one branch to ambient temperature is calculated with the formula:

$$wam = wam0 \cdot \left(\frac{\overset{\circ}{v}}{\overset{\circ}{v}_0}\right)^{x\vartheta} \cdot fup - VK - sun$$

wherein wam0 is a reference value of the dissipated thermal power, $\vartheta$ is a difference in temperature between average oil temperature in the at least one branch and the ambient temperature, $\vartheta_0$ is a reference value for a difference in temperature $\vartheta$ for which the value wam0 is defined, $x\vartheta$ is an exponent for heat transfer between the oil and ambient temperature, as a function of the manner of cooling, fup is a factor for at least one of the influence of the ambient temperature and if appropriate the air pressure, VK is leakage power loss in at least one of a tank of the transformer and a cooler branch which represents a surface of the tank, and sun is the power of solar irradiation on the tank.

21. The method according to claim 14, wherein the average temperature in the at least one loss-producing part of the transformer is calculated with the following differential equation:

$$\frac{d}{dt}tqm = \frac{V_{tot} - wim}{cqg}$$

wherein tqm is an average temperature of the least one loss-producing part, $V_{tot}$ is a total loss of the at least one loss-producing part, cqg is thermal capacity of the at least one loss-producing part, and wim is power loss dissipated from the at least one loss-producing part to oil flowing past the at least one loss-producing part.

22. The method according to claim 21, wherein the power loss wim dissipated to the oil flowing past the at least one loss-producing part is calculated with the formula:

$$wim = V0g \cdot \left(\frac{g}{g0}\right)^{xg}$$

wherein V0g are reference losses, g is a difference between an average temperature of the at least one loss-producing part and an average temperature of oil in contact with the at least one loss-producing part, referred to as average jump, g0 is average jump in a steady state and with the reference losses and xg is an exponent for heat transfer between the at least one loss-producing part and the oil as a function of the oil temperature and oil velocity.

23. The method according to claim 14, wherein for each individual branch in the hydraulic network, a vector for a virtual driving pressure difference f, is defined by the equation:

$$f = g \cdot \rho \cdot \beta \cdot \Delta H \cdot T + pd$$

wherein f is the driving pressure difference, g is acceleration due to gravity, $\rho$ is the density of the oil, $\beta$ is a coefficient of expansion of the oil, $\Delta H$ is a difference in height between a starting point and an end point of the branch, T is an average temperature of the oil in the branch, and pd is a pressure difference caused by a pump in the branch, and wherein a vector $\phi$ of a totality of all the oil flow in the individual branches is calculated with the matrix equation: $\Phi = TTRTT \cdot f$, wherein TTRTT defines a matrix which contains information on hydraulic resistances in all the branches and on structural characteristics of the hydraulic network.

24. The method according to claim 23, wherein the vector $\phi$ of the oil flow is ascertained in an iterative process which is continued until an initial value and result coincide with a predetermined adequate accuracy.

25. The method according to claim 23, wherein a feedback of the state variables constituted by temperatures of at least one of the hydraulic flow resistances or the oil flow is carried out in the thermohydraulic model, the totality of all the oil flows, represented by the vector $\Phi$, being temperature-dependent in two ways, on one hand on a driving pressure difference and on the other hand on the viscosity of the oil and consequently the hydraulic flow resistances.

26. The method according to claim 23, wherein a continuous adaptation of parameters is carried out with two auxiliary variables, a first auxiliary variable taking into consideration a dependence of the losses on the temperature and a second auxiliary variable taking into consideration a dependence of the oil flow on the temperature, and wherein non-linear behavior of the oil flow with regard to pressure drop and flow rate is simulated by a feedback from the oil flow via the hydraulic resistances.

27. The method according to claim 14, wherein the input variables comprise at least one of voltages at terminals of the transformer, currents in windings of the transformer, and ambient temperature surrounding the transformer.

28. The method according to claim 27, wherein the voltage measurements are used to ascertain a relationship between the voltages and magnetic flux leakage in individual parts of a core of the transformer by the use of a voltage-magnetic leakage flux assignment matrix, and wherein idling losses are subsequently ascertained in as a function of the magnetic flux leakage by a characteristic curve defined by predetermined parameters.

29. The method according to claim 27, wherein internal winding branches of the transformer are defined, linked with the current measurements, by the use of a current assignment matrix, all the current measurements being represented as a vector with two components such that phase position is taken into consideration, and wherein an amount of current with which ohmic losses are calculated, via an appropriate resistance, is ascertained for each internal winding branch, and wherein distribution of magnetic flux leakage is ascertained from a distribution of currents between individual windings with matrices which are defined both for axial components and for radial components, and from the matrices eddy-current losses in the individual windings and in inactive parts of the transformer are ascertained, and wherein a relationship between the currents in the internal winding branches and the magnetic flux leakage relevant for loss-producing branches is ascertained by a currents-internal windings currents matrix, and the eddy-current losses are calculated with factors which are ascertained from winding geometry of the transformer.

30. The method according to claim 29, wherein the voltage-magnetic leakage flux assignment matrix, the currents-internal winding currents matrix, and the ohmic winding resistances are checked and changed if appropriate.

31. The method according to claim 29, wherein the matrices, the relevant assignment matrix, and ohmic winding resistances are dependent on the at least one switch position.

32. The method according to claim 27, wherein the current measurements are taken at the terminals of the transformer.

33. The method according to claim 32, wherein a digital computer is provided and of which ascertains the thermohydraulic model, with memory units in which algorithms for the thermohydraulic model are stored, to which computer comprises at least one input keyboard, at least one display device, and at least one interface for preparing the input variables is connected.

34. The method according to claim 33, wherein the at least one display device comprises a screen.

35. A method for ascertaining state variables, in particular temperatures, in an oil-cooled transformer, comprising:
  measuring input variables comprising at least one of voltages at transformer terminals, currents in windings and ambient temperature;
  defining at least one of a state of cooling units of the transformer comprising at least one of fans and pumps, and a position of at least one switch;

feeding the input variables and the status of the cooling units and the position of the at least one switch into a thermohydraulic model;

calculating state variables in the thermohydraulic model from auxiliary variables which comprise at least one of losses in the transformer, parameters for heat transfer, flow resistances and flow or flow rates in an oil circuit and from a hydraulic network of the oil circuit which has branches, wherein the hydraulic network is part of the thermohydraulic model and the state variables comprise at least one of average temperatures and hotspot temperatures in loss-producing parts of the transformer, and average oil temperatures in branches and in nodes of the hydraulic network of the oil circuit;

adapting the auxiliary variables as a function of the present value of the state variables when there is a change in at least one of the input variables and the status of at least one of the cooling units and the switch position;

calculating a change over time of the state variables; and calculating new state variables based upon the change over time of at least one of the input variables, the state of the cooling units, and the position of the at least one switch.

* * * * *